United States Patent [19]

Courduvelis

[11] Patent Number: 4,956,097

[45] Date of Patent: Sep. 11, 1990

[54] WASTE TREATMENT OF METAL CONTAINING SOLUTIONS

[75] Inventor: Constantine I. Courduvelis, Orange, Conn.

[73] Assignee: Enthone, Incorporated, West Haven, Conn.

[21] Appl. No.: 425,493

[22] Filed: Oct. 12, 1989

Related U.S. Application Data

[63] Continuation of Ser. No. 255,471, Oct. 11, 1988, abandoned.

[51] Int. Cl.$^5$ .................................................. C02F 1/62
[52] U.S. Cl. .................................. 210/718; 210/719; 210/912; 204/DIG. 13; 75/740; 75/726; 502/516
[58] Field of Search ............... 210/719, 720, 718, 724, 210/738, 743, 750, 762, 763, 912–914; 204/DIG. 13; 423/34, 140; 502/516; 75/108, 109

[56] References Cited

U.S. PATENT DOCUMENTS

| | | | |
|---|---|---|---|
| 4,425,205 | 1/1984 | Honma et al. | 204/DIG. 13 |
| 4,645,607 | 2/1987 | Divisek et al. | 210/719 |
| 4,675,111 | 6/1987 | Newton et al. | 210/912 X |

FOREIGN PATENT DOCUMENTS 1958169 of 0000 Fed. Rep. of Germany.
187634 of 0000 Japan.

OTHER PUBLICATIONS

Chemical & Engineering News, vol. 13, Dec. 1971, No. 51, p. 35.

*Primary Examiner*—Tom Wyse
*Attorney, Agent, or Firm*—John J. Tomaszewski; Kenneth A. Koch

[57] ABSTRACT

A method for waste treating metal containing solutions comprising decomposing the metal from the solution in the substantial absence of air and separating the decomposed (precipitated) metal from the solution.

8 Claims, 1 Drawing Sheet

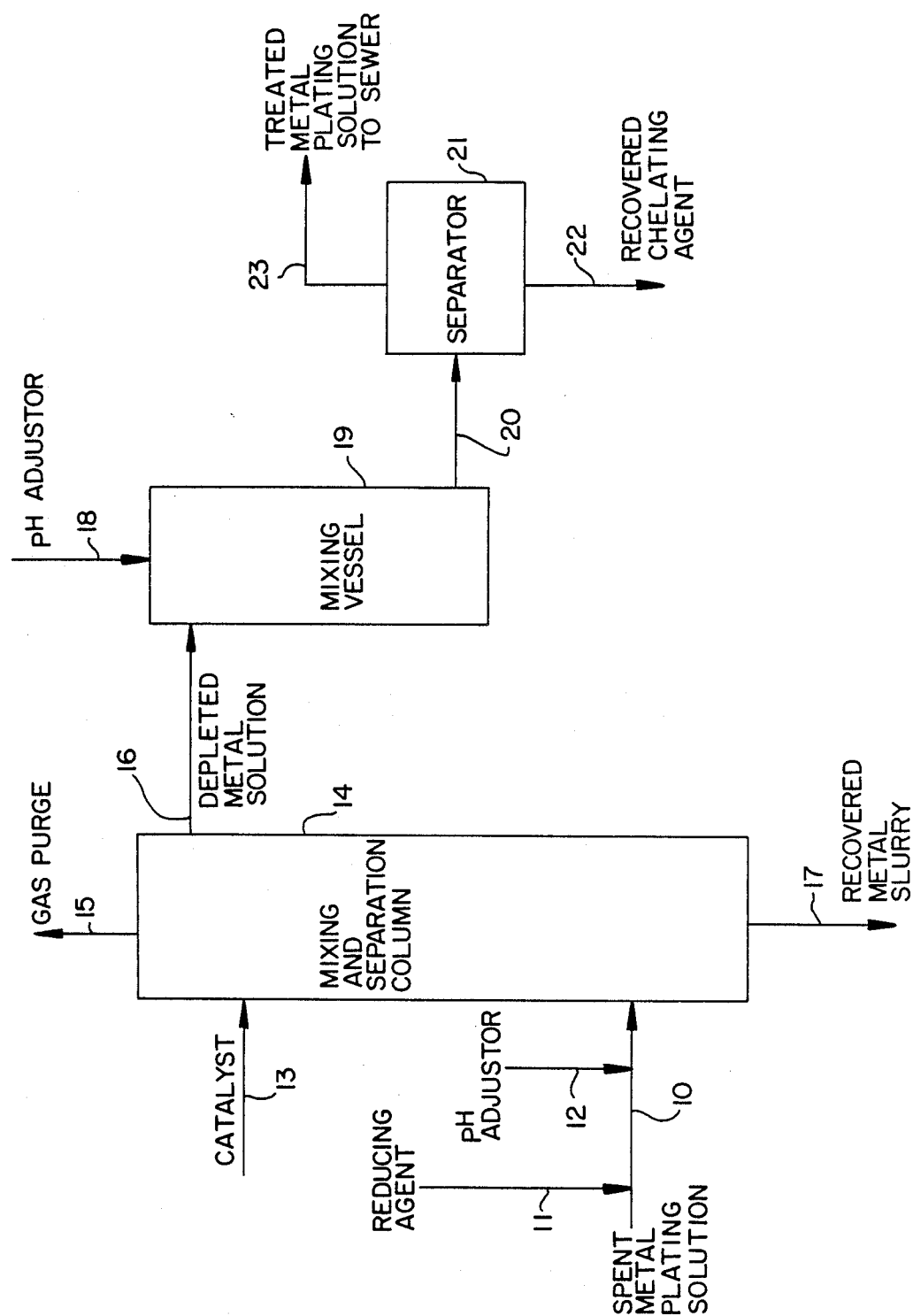

WASTE TREATMENT OF METAL CONTAINING SOLUTIONS

This is a continuation of copending application(s) Ser. No. 07/255,471 filed on Oct. 11, 1988, now abandoned.

BACKGROUND OF THE INVENTION

The invention relates to the waste treatment of metal containing solutions and, more particularly, to reducing the amount of metal in a spent electroless metal plating solution to allow discharging the solution into a waste system.

The waste treatment of contaminant effluent solutions is a well-known environmental and economic problem which government is attempting to control by setting vigorous standards for their discharge into waste systems such as sewage plants and waterways.

Metal containing solutions represent a large part of the effluents requiring waste treatment with a major source being electrolytic and electroless metal plating processes. Existing waste treatment processes include precipitation, evaporation, ion exchange and electrolysis and a number of patents have been granted relating to these methods.

U.S. Pat. No. 4,420,401 relates to the waste treatment of electroless nickel and copper solutions and a number of representative plating solutions are noted therein, the contents of this patent and the patents shown on lines 65 and 66 of column 1 being hereby incorporated by reference. The disclosed process treats waste spent electroless solutions, which contain metal ions, complexing agents, reducing agents, pH adjusters and other conventional additives such as stabilizers, brighteners, etc. The first step is to ensure that the solutions are capable of electrolessly plating by adjusting the pH and/or adding sufficient reducing agents to enable plate-out of the metal ions. A seeder comprising a particulate material of large surface area having a catalytic noble metal absorbed on its surface is contacted with the solution and the metal ions decompose and plate out on the seeder which is then removed from the solution. The prior art method disclosed in the patent was to load the solution with a material catalytic to the plating reaction causing the solution to undergo spontaneous decomposition and precipitation of the metal.

U.S. Pat. No. 4,425,205 describes a regeneration process wherein a part of the electroless plating bath is treated with a palladium catalyst to precipitate and remove copper. The solution is then treated with acid to precipitate the chelating agent, with the precipitated chelating agent slurry electrolyzed and recycled to the electroless plating bath as a copper complex compound.

A chemical method for precipitating copper, nickel and cobalt from spent electroless plating solutions using sodium hydrosulfite is shown in U.S. Pat. No. 3,770,630.

Using a somewhat novel technique to remove metals from solutions, U.S. Pat. No. 3,755,530 injects droplets of the spent electroless plating solution into a refrigerant to quick-freeze them, followed by removal of ice (water) by sublimation in a controlled vacuum. U.S. Pat. No. 4,144,149 eliminates the metal solubilizing complexing ability of the chelating agent by electrolysis and precipitating metallic copper from the solution. U.S. Pat. No. 4,428,773 removes copper from electroless solutions by heating the solution in a titanium vessel with stirring and the bubbling of air until copper and copper oxide precipitates are formed. The use of ion exchange resins to remove copper from electroless solutions is shown in U.S. Pat. No. 4,666,683.

While the prior art processes reduce the metal content of the plating solutions, the need still exists for efficient and economical methods for waste treating the solutions.

SUMMARY OF INVENTION

The method of waste treating metal containing solutions having a reducing agent therein by decomposition (plating) of the metal from the solution and separation of the metal from the solution has been improved by operating the decomposition reaction in the substantial absence of air. The method may be carried out batchwise or, preferably, continuously in, for example, a column wherein the spent solution is introduced into the lower end of the column and the waste treated solution removed from the upper end of the column. The metal precipitate settles in the column and may be removed from the lower end thereof.

Using the method of the invention metal levels may be reduced to any level, e.g., below 5 ppm and even below 1 ppm if desired.

In a preferred embodiment, the spent metal solution is adjusted to the desired pH and reducing agent concentration before being decomposed. Generally, a stoichiometric excess of reducing agent vis-a-vis the metal content is employed. Decomposition of the solution may then be accomplished by seeding with a noble metal catalyst such as palladium or silver, an initiator metal like copper or strong reducing agents like borohydrides, boranes, hydrazines, etc.

Some chelating agents may be recovered from the treated solution by acidification. Exemplary chelating agents are ethylenediamine tetraacetic acid (EDTA) and diethylene triamine pentaacetic acid (DETPA), which become insoluble in the free-carboxylic acid form. The chelating agent is then separated and recovered and the solution discharged to the waste system. In general, the spent solution contains, by weight, about 1–4 grams/liter (g/l) metal and 20–50 g/l chelating agent and the solution discharged to the waste system less than 5 ppm metal, e.g., 0.1–3 ppm and less than 5 g/l chelating agent, e.g., 0.5–2 g/l. The temperature of the decomposition step of the process may vary up to boiling, e.g., room temperature to 95° C., preferably about 50 to 90° C. and most preferably about 60 to 80° C.

BRIEF DESCRIPTION OF THE DRAWING

The invention is further set forth in the following detailed description taken in conjunction with the appended drawing, in which the single FIGURE is a flow sheet showing the treatment of a spent metal plating solution in accordance with the invention.

DETAILED DESCRIPTION OF THE INVENTION

The metal solutions to be waste treated may come from a variety of sources such as metal process streams from mining and metallurgical operations, electrolytic and electroless metal plating baths, chemical manufacture, and the like. Metals such as copper and nickel may be treated according to this invention and for convenience, the following description will be directed to treating spent electroless copper metal plating baths.

A typical electroless copper plating bath contains the copper ion, a pH adjusting agent, a reducing agent to reduce the copper ion to copper metal, a copper chelating agent to stabilize the bath and other additives such as brighteners. As the bath is used the copper and reductant are consumed and the pH changes and the bath is regenerated by adding more of these materials usually in the form of aqueous solutions. When solutions are used, an equal volume of the plating solution is removed from the tank to maintain the proper level in the tank and avoid overflow. The removed solution needs to be waste treated. Additionally, when the plating solution reaches the point where it cannot be regenerated, usually because of too many plating cycles, this solution must also be waste treated.

In general, an electroless copper bath has the following concentration of ingredients in grams/liter together with other process metals and dissolved salts and additives:

| Ingredient | Amount |
|---|---|
| Copper | 1-4 |
| Reducing agent (formaldehyde) | .5-10 |
| pH | 12-14 |
| Chelator | 10-80 |

The plating solution to be waste treated is fed into mixing and separation column 14 through line 10. Adjustment of the solution may be made by adding reducing agent through line 11 and/or a pH modifier through line 12. Any suitable reducing agent may be used and it is preferred to use the same agent as present in the spent solution. Typically, formaldehyde is used. The pH adjusting agent is usually an alkaline material to bring the pH to a range of about 12 to 14. Exemplary base agents are NaOH and KOH.

Decomposition of the solution to precipitate the copper is preferably accomplished by adding a catalyst to column 14 through line 13. Catalyst addition is usually required only at the start of the process since the decomposition reaction is autocatalytic and suitable catalysts include palladium, silver compounds and reductants like boranes and borohydrides. Other methods for initiating copper precipitation are adding a reactive metal such as copper to the column or maintaining the solution at a high temperature and a high pH. In general, the operating temperature of the bath may be up to boiling, e.g., about room temperature to boiling, and preferably about 50 to 90° C., and most preferably 60-80° C.

The main decomposition reaction in column 14 is believed to be

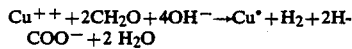
$Cu^{++} + 2CH_2O + 4OH^- \rightarrow Cu^\circ + H_2 + 2HCOO^- + 2H_2O$ Hydrogen or other generated gases are purged through line 15. As the freshly formed copper acts as a catalyst in the above reaction, it is important that the decomposition reaction occur in the substantial absence of air to avoid oxidation of the copper and loss of catalytic activity. If the copper is oxidized, high copper levels will result in the depleted copper solution exiting the column through line 16. The recovered copper leaves the column through line 17 and is essentially pure copper metal which may be recycled and used to prepare new electroless copper baths or to regenerate operating baths.

The copper depleted stream 16 may now be discharged to the sewer. Depending on the flow rates and temperature of the process, the copper level may be adapted to the desired concentration, preferably below about 1 ppm. It is preferable though, to remove the chelating agent from the solution for both economic and environmental reasons before discharge to the sewer.

Chelating agents are an important ingredient in electroless plating solutions and are used where the metal salts in an alkaline solution would otherwise precipitate as insoluble hydroxides, carbonates or oxides of the particular metals. Solubilizing or chelating agents capable of such use are varied and for example may be represented by an array of organic amine complexes, such as alkyl-amines, organic acids such as citric, and tartaric; and a combination of organic acids with the amines. Examples of the latter are well known complexing agents, such as ethylene diamine tetra acetic acid (EDTA), and nitrilo acetic acid (NTA) or their salts, tetra bis-2-hydroxy tripropyl ethylene diamine, hydroxy ethyl-ethylene diamine triacetic acid, etc.

The depleted copper solution 16 is fed into mixing vessel 19 and the pH adjusted to precipitate the chelating agent. For EDTA the pH is about 1 to 3 and preferably 1.2 to 2. The precipitated slurry in mixing vessel 19 is fed into separator 21 through line 20 and separated into the solid recovered chelating agent through line 22 and the discharge stream through line 23 into the sewer or other waste stream.

The following example will illustrate the process of this invention.

EXAMPLE I

A spent electroless copper plating solution containing 2 g/l copper, 36 g/l EDTA and 0.8 g/l formaldehyde was adjusted to a pH of 12.5 using a NaOH solution. 300 gallons were passed into a column (8 feet high × 15 inch diameter) at a rate of 900 mls/min. 3 mls. of 12% solution of NaBH₄ catalyst was added to the column. The temperature of the solution in the column was 77° C.

Hydrogen gas was evolved and purged at the top of the column. A headspace of hydrogen was maintained at the top of the column and air was kept out of the solution and the column.

About 2757 grams of copper metal was recovered from the lower end of the column indicating over a 99% recovery. The depleted copper solution was removed at the upper end of the column and contained about 0.7 ppm copper. The depleted copper solution was transferred to a mixing vessel where the pH was adjusted to about 1.5 using H₂SO₄. The precipitated slurry was continually removed from the mixer and separated. A total of about 39,600 grams of chelator was recovered indicating over a 96% recovery. The final treated solution contained 0.7 ppm copper and a volume of 345 gallons were obtained and the treated solution was able to be dumped to a municipal waste system.

It will be apparent that many changes and modifications of the several features described herein may be made without departing from the spirit and scope of the invention. It is therefore apparent that the foregoing description is by way of illustration of the invention rather than limitation of the invention.

I claim:

1. In a process for waste treating a metal and reducing agent containing solution by loading the solution with a catalytic material which decomposes the solution and precipitates the metal and generates a gaseous reaction product, separating the precipitated metal and discharging the solution into a waste system, the improvement comprising:

performing the decomposition reaction in the substantial absence of air in a closed vessel from which the gaseous reaction product formed during the waste treatment process is purged.

2. The process of claim 1 wherein the metal containing solution is an electroless copper plating bath.

3. The process of claim 2 wherein the solution is adjusted to a pH of 12-14 and at least a stoichiometric amount of reducing agent is in the solution based on the copper content of the solution.

4. The process of claim 3 wherein the decomposition material is selected from the group consisting of noble metal catalysts, an initiator metal and reducing agents capable of decomposing the metal.

5. The process of claim 4 wherein the temperature of reacting step (c) is about 50-90° C.

6. The process of claim 5 wherein the process is performed in a column wherein the metal containing solution to be treated enters at the lower end of the column and the treated solution leaves at the top end of the column.

7. The process of claim 6 wherein the decomposition material is palladium.

8. The process of claim 6 wherein the decomposing material is sodium borohydride.

* * * * *